United States Patent [19]

Church et al.

[11] Patent Number: 4,522,359

[45] Date of Patent: Jun. 11, 1985

[54] DOOR ANTI-HIJACKING LATCH/LOCK MECHANISM WITH PNEUMATIC DECOMPRESSION OVERRIDE

[75] Inventors: Royce F. Church, Lynnwood; Donald B. McCaffrey, Edmonds; Leo W. Plude, Redmond, all of Wash.

[73] Assignee: The Boeing Company, Seattle, Wash.

[21] Appl. No.: 444,245

[22] Filed: Sep. 30, 1982

[51] Int. Cl.$^3$ ................................................ B64C 1/14
[52] U.S. Cl. .......................... 244/129.5; 292/DIG. 65; 244/129.4
[58] Field of Search ................ 244/1 R, 118.5, 129.4, 244/129.5, 137 P; 292/144, 201, DIG. 65; 109/61, 62, 63.5; S2/1; 49/394, 449

[56] References Cited

U.S. PATENT DOCUMENTS

| | | | |
|---|---|---|---|
| 1,950,843 | 3/1934 | Fischer | 292/144 |
| 2,156,387 | 5/1939 | Goldfinger | 292/144 |
| 2,606,052 | 8/1952 | Soreng et al. | 292/144 |
| 3,704,845 | 12/1972 | Ord | 244/118.5 |
| 3,738,681 | 6/1973 | Wada et al. | 292/DIG. 65 |
| 3,753,316 | 8/1973 | Savarieau et al. | 292/144 |
| 3,938,764 | 2/1976 | McIntyre et al. | 244/118.5 |
| 3,981,302 | 9/1976 | Veit | 244/118.5 |

Primary Examiner—Trygve M. Blix
Assistant Examiner—Rodney Corl
Attorney, Agent, or Firm—Conrad O. Gardner; Bernard A. Donahue; Nicolaas DeVogel

[57] ABSTRACT

An aircraft door having an electrically operated latching device (601) engaged only when electrical power is applied. Latch logic permits release by actuation of a switch (603) on the pilot's panel, by loss of electrical power (602), by a knob on the control cabin side (605) or by a key from outside the control cabin (604). The aircraft door controlled by the electrically operated latching device (601) further includes a decompression override mechanism (606).

4 Claims, 8 Drawing Figures

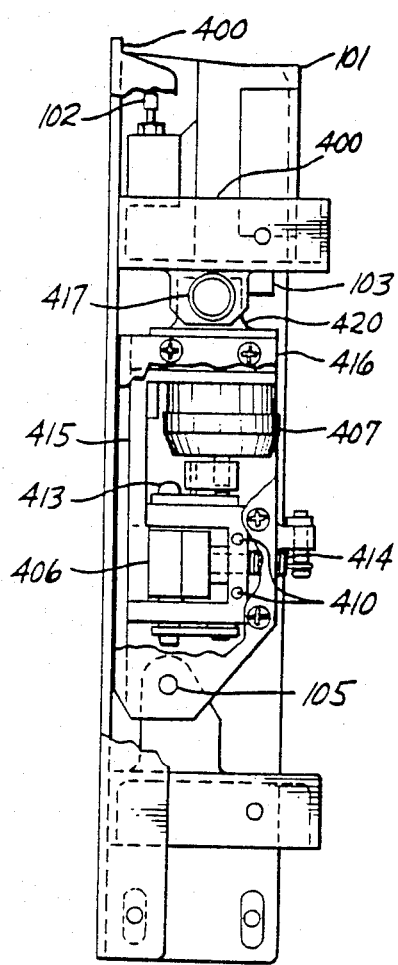
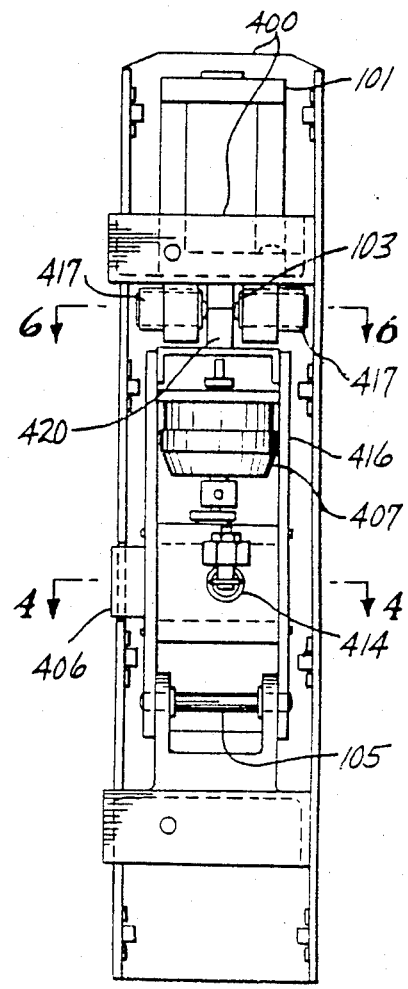

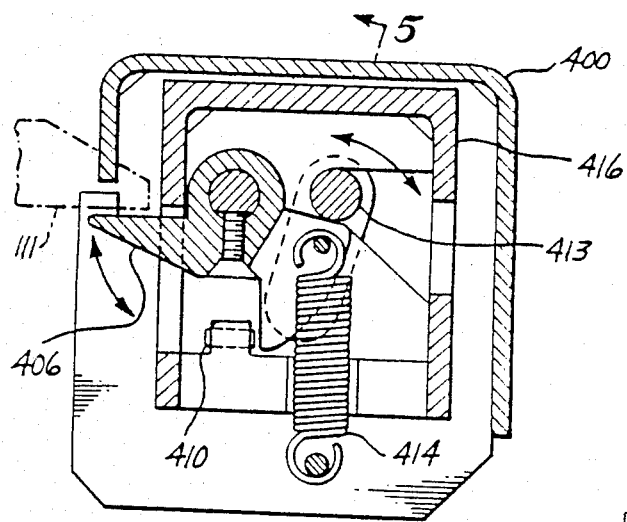
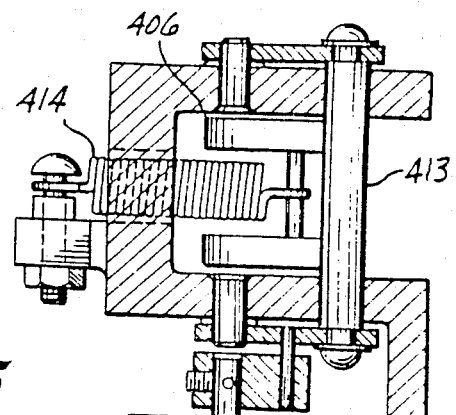
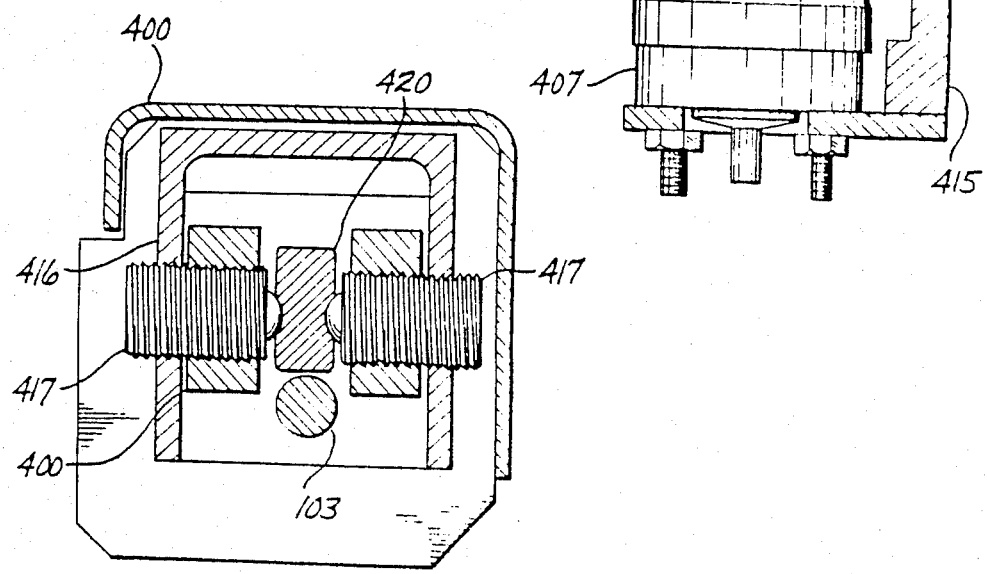

DOOR ANTI-HIJACKING LATCH/LOCK MECHANISM WITH PNEUMATIC DECOMPRESSION OVERRIDE

The present invention relates to aircraft cabin door entry locking or latching mechanisms and more particularly to an aircraft door anti-hijacking latch/lock mechanism having pneumatic decompression override.

Heretofore, latching or locking mechanisms employing a pneumatic input for one objective or another have been seen. A shearing feature in door locking can be seen in the patent literature as represented by U.S. Pat. No. 1,466,207 and U.S. Pat. No. 1,550,953. A further U.S. Pat. No. 4,042,193 is referenced which is primarily illustrative from an environmental point of view.

Present latching on control cabin entry doors utilized a decompression mechanism composed of shear rivets as the primary control element. These rivets were designed to shear at a low force level, determined by the allowable differential pressure across the door. As a consequence and in contrast to the preceding the present invention provides a decompression override mechanism feature resulting from required antihijacking, bullet resistance control cabin entry door. The present door anti-hijacking latch/lock mechanism utilizes in combination an electrically operated latching device engaged only when electrical power is applied. Logic control of the latch also allows release by actuation of a switch on the pilot's panel, by loss of electrical power, by a knob on the control cabin side, or by a key from outside the control cabin.

Modification of existing prior art door knobs in contrast would provide designs which are subject to friction losses and poor mechanical advantages as would occur in designs which dispose part of the mechanism in a door post. The preceding two approaches in mechanism configuration would result in complex high inertia systems. As a consequence, it is an object of the present invention to provide anti-hijacking capability coupled with fast response time and sensitivity mandated by decompression requirements.

In accordance with a first embodiment of the present invention, a decompression override mechanism having a fast response time is provided which satisfies the decompression requirements while further providing protection against forced entry into the control cabin.

Other objects and advantageous features of the preferred embodiment of the present invention will become readily apparent in view of the following detailed description taken in conjunction with the drawings in which:

FIG. 2 is a side view of the second embodiment of the present door anti-hijacking latch/lock mechanism with pneumatic decompression override as shown in FIG. 1 however modified in that the linear solenoid, striker, and shear rivets are replaced with a rotational solenoid, spring-returned striker and spring loaded ball/detent arrangement in lieu of shear rivets;

FIG. 3 is a front view of the second embodiment of the present door anti-hijacking latch/lock mechanism with pneumatic decompression override as shown in FIG. 2;

FIGS. 4 and 5 are cross-sectional views of the electrical latching section of the present door anti-hijacking latch/lock mechanism with pneumatic decompression override as shown in FIGS. 2 and 3;

FIG. 6 is a cross-sectional view of the spring loaded ball/detent arrangement of the present door anti-hijacking latch/lock mechanism with pneumatic decompression override as shown in FIGS. 2 and 3;

Figure 1:
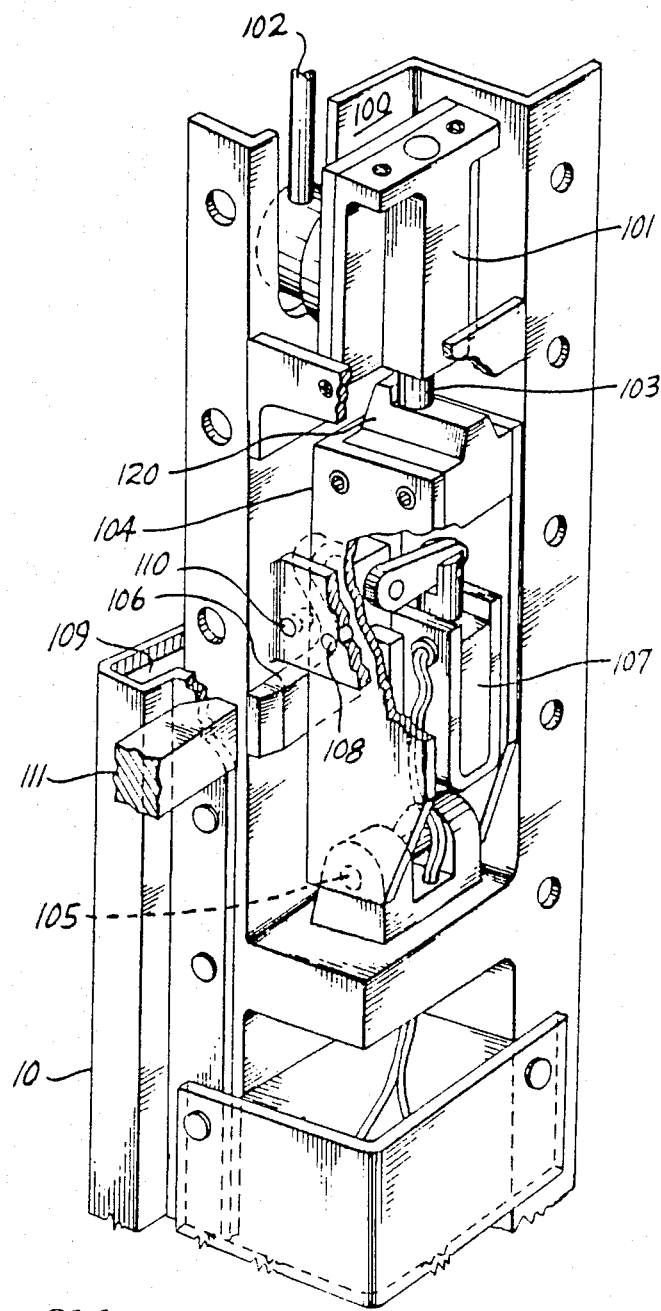
FIG. 1 is a first embodiment of the present door anti-hijacking latch/lock mechanism with pneumatic decompression override utilizing shear rivets for satisfying the decompression requirement.

Turning now to FIG. 1, it should be noted that during decompression a pneumatic mechanism 101 inside the support fitting 100 housed in door post 10 and protected by a bullet-resistant material 109, senses the differential pressure between the control cabin and passenger compartment. Pressure on the passenger side is ducted to the pneumatic mechanism through flexible tubing 102. At a predetermined small differential pressure, pneumatic mechanism 101 releases a spring-loaded piston 103 retracting spring-loaded piston 103 into the body of the pneumatic mechanism 101 clearing appendage 120 attached to retainer 104. Simultaneously, the force due to the differential pressure across the door is transferred through door bolt 111 and striker 106 attached to retainer 104, into shear rivets 108. The time for the pressure force to build up to the shear level of the rivet coincides with the time that spring-loaded piston 103 clears appendage 120. Once the rivets have been sheared, retainer 104 is free to rotate about hinge pin 105 thereby allowing the door to open and equalize the cabin pressure.

Normal unlatching of the door is accomplished by either the use of the key from the passenger compartment side, a manual handle on the control cabin side, electrically by a switch in the pilot's overhead panel, or by the loss of electrical power (not shown). The electrical latching/unlatching function shown hereinafter in the logic diagrams of FIGS. 7 and 8 is provided by coupling through solenoid 107 mounted in retainer 104.

As electrical power is applied, solenoid 107 retracts causing striker 106 to rotate and extend, overlapping door bolt 111. The door is then locked and latched until either it is opened by a key from the passenger compartment (shown in the logic control diagrams of FIGS. 7 and 8) (thereby extracting the door bolt 111), the manual handle on the control cabin side (which also extracts the door bolt 111), or sudden decompression as sensed by pneumatic decompression mechanism 101 (input 606 of FIGS. 7 and 8). Door striker 106 rotation is adjusted by adjusting screw 110. Disconnecting the power, either by the switch on the pilot's overhead panel or by the loss of electrical power as shown in the control diagrams of FIGS. 7 and 8, causes the internal spring of solenoid 107 to extend and rotate striker 106 clear of door bolt 111. The door is then in an unlocked condition as shown at 601 in the logic diagram of FIG. 7 and thus free to rotate. The conditions for normal unlatching of the door hereinabove described are seen as inputs 602, 603, 604 or 605 of FIG. 7.

Figure 7:
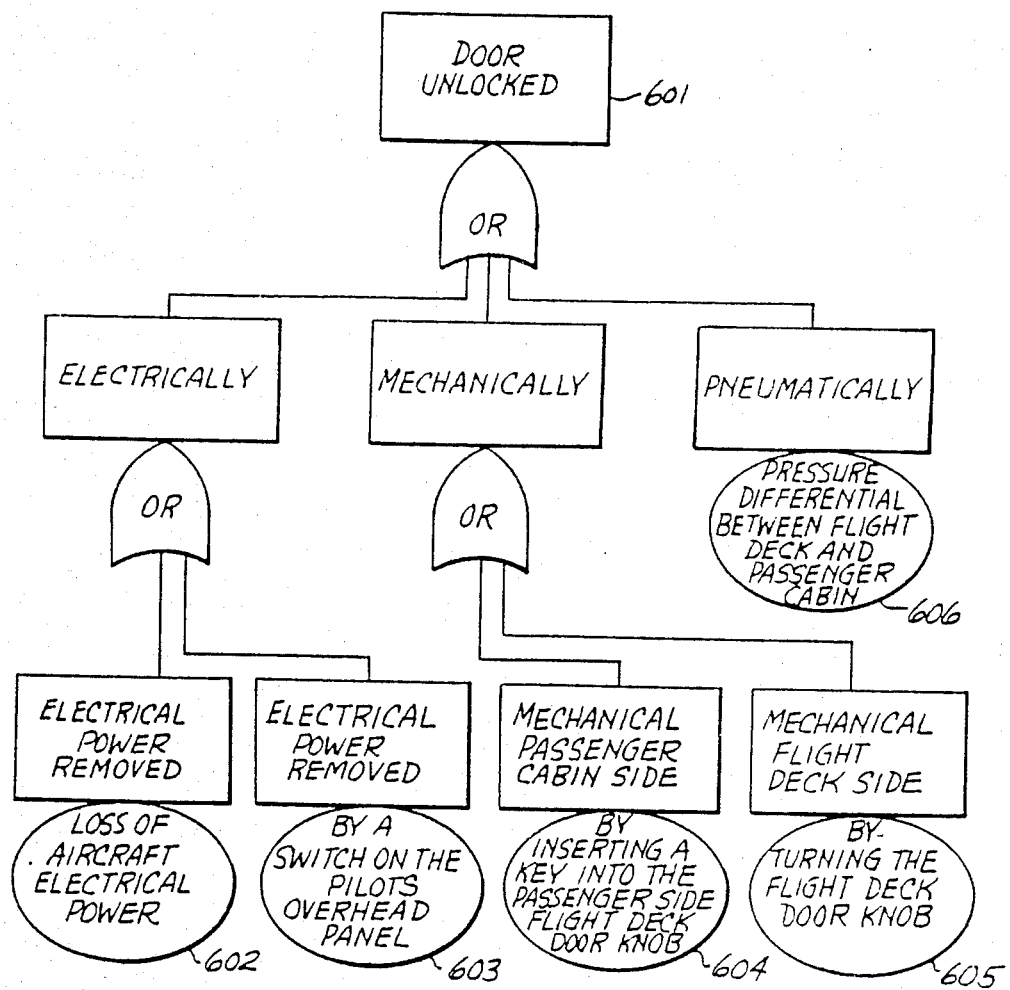
FIG. 7 is a schematic diagram showing door unlock logic for the present door anti-hijacking latch/lock mechanism with pneumatic decompression override shown in FIGS. 1–6; and, FIG. 8 is a block diagram showing override logic for controlling the door anti-hijacking latch/lock mechanism with pneumatic decompression override shown in FIGS. 1–6.
Figure 8:
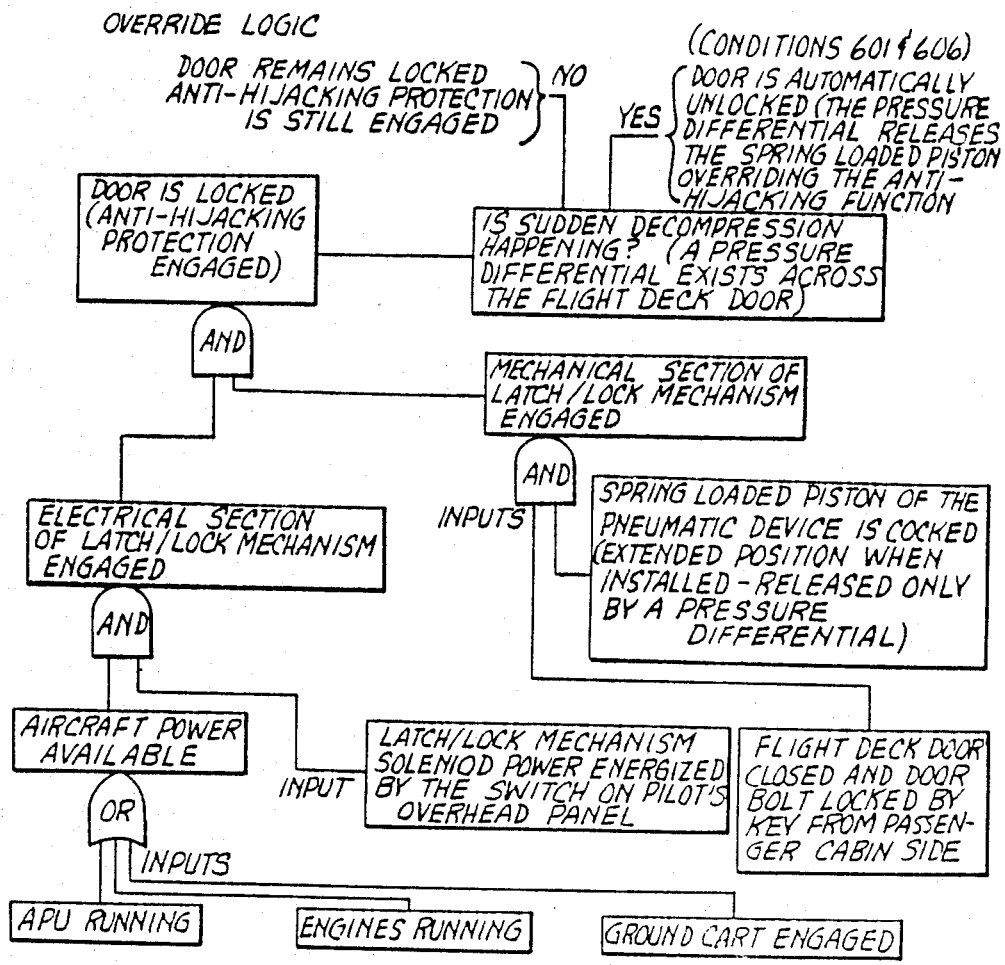

Conditions for override logic control (input 606) of the present door anti-hijacking latch/lock mechanism are seen in FIGS. 7 and 8. Anti-hijacking capability is also provided by pneumatic mechanism 101 once electrical power is applied and the passenger compartment door knob is locked by use of a key. Initial application of force to gain entry causes partial shearing of the rivets 108 shown in FIG. 1 once the loads exceed their designed shear level. Appendage 120 of retainer 104 then contacts the piston of pneumatic mechanism 101 and subsequent forced entry is stopped. Partial shearing of rivet 108 results since a gap is provided between the piston and appendage 120 to ensure the piston is unloaded during decompression. This unloading minimizes friction and piston actuation/retraction time.

The embodiment of FIG. 1 of the present door antihijacking latch/lock mechanism with pneumatic decompression override is seen to include shear rivets utilized in decompression override. Such use of shear rivets to isolate pneumatic mechanism and spring loaded piston from pressure and friction loads during decompression thereby maximizes performance (minimized friction and activation/retraction time). The use of shear rivets 108 provides isolation of pneumatic mechanism 101 from loads encountered during normal use. Also, the isolation of decompression mechanism 101 in door post 10 makes it less susceptible to gun fire damage. It should also be noted that the separation of electrical and pneumatic functions from the manual operation of the door latch permits the use of existing door latch mechanisms in combination with the present control functions as shown in the control diagram of FIGS. 7 and 8.

Turning now to FIGS. 2, 3 and the cross-sections thereof taken along the lines 4—4 and 6—6 as seen in FIG. 3, and along line 5—5 as seen in FIG. 4, it can be seen when comparing with the first embodiment of FIG. 1 that the linear solenoid 107 and striker 106 of FIG. 1 is replaced in the second embodiment of FIGS. 2, 3, 4 and 5 with a rotational solenoid 407 and associated spring-returned striker 406. Rotational solenoid 407, striker 406 and striker return spring 414, striker adjusting screws 410 and striker locking pin 413 are all housed in support fitting 415 which is attached inside retainer 416. Shear rivet 108 shown in the first embodiment of FIG. 1 is replaced in the second embodiment of FIGS. 2, 3 and 6 with relocated opposing spring loaded balls 417. Appendage 120 and support fitting 100 shown in the first embodiment of FIG. 1 are replaced in the second embodiment of FIGS. 2, 3, 4 and 6 with a modified detent appendage 420 and support fitting 400.

When electrical power is applied to rotational solenoid 407 of the second embodiment shown in FIGS. 2 and 3 and in cross-section in FIG. 5, striker locking pin 413 which is mechanically connected to rotational solenoid 407, rotates counter-clockwise (as seen in FIG. 4) to a position behind striker 406. This prevents striker 406 from rotating in the counter-clockwise (unlatching) direction. The removal of electrical power to solenoid 407, either by the switch on the pilot's overhead panel or by loss of electrical power (as seen in the logic control diagrams of FIGS. 7 and 8) allows the torsional spring inside solenoid 407 to rotate striker locking pin 413 clockwise (FIG. 4) to the unlocked position. With striker locking pin 413 in the unlocked position, the door remains latched (closed) due to the force exerted by striker return spring 414. A small force applied to the door causes the door bolt 111 (as seen in FIG. 4) to rotate striker 406 in the counterclockwise (unlatched) position. Once door bolt 111 clears striker 406, the striker return spring automatically returns striker 406 up against adjustment screw 410. The cross-sectional view of FIG. 4 shows the electrical latching section of the present door anti-hijacking labor lock mechanism with pneumatic override in the locked position; that is, with electrical power engaged.

Anti-hijacking capability is retained in the second embodiment of FIGS. 2-6 once electrical power is applied and the passenger compartment door knob is locked by use of a key. Initial application of force to gain entry causes the spring loaded balls 417 to ride partially out of the detent (depression) of detent appendage 420 on retainer 416. Retainer 416 then contacts the spring loaded piston 103 of pneumatic mechanism 101 and subsequent forced entry is stopped. When the application of force is removed the spring loaded balls 417 automatically return the retainer 416 and detent appendage 420 to their initial position, thus isolating the pneumatic mechanism 101 and spring loaded piston 103 from loads encountered during normal use (a gap is provided between the detent appendage 420 and spring loaded piston 103 as shown in FIG. 6). The spring loaded balls 417 are sized so that the time required for the force (resulting from the pressure differential during decompression) to build to a level needed to bring the detent appendage 420 in contact with the spring loaded piston 103, coincides with the time the spring loaded piston 103 clears the detent appendage 420. This restoring function provided by the spring loaded ball/detent arrangement in the second embodiment of FIGS. 2, 3 and 6 eliminates the need to inspect the mechanism after an inadvertent load is applied which was not provided by the shear rivets in the first embodiment of FIG. 1. The use of the spring loaded ball/detent arrangement of the second embodiment of FIGS. 2, 3 and 6 is adjustable and can be nondestructively tested to ensure correct operation which was not provided with the shear rivets 108 in the first embodiment of FIG. 1.

The alternative use in the second embodiment of FIGS. 2, 3, 4, 5 and 6 utilizing a spring return striker and rotational solenoid to provide the additional capability needed to keep the door in a latched (closed) position when electrical power is removed and the use of spring loaded ball/detents to minimize friction, activation/retraction times, eliminate inspection, provide adjustability and allow functional testing can be readily seen as hereinbefore described.

The door unlocked state 601 in logic control diagram as shown in FIG. 7 and the override logic control shown in FIG. 8 are coupled between solenoid control in the present embodiments of door anti-hijacking latch/lock mechanisms with pneumatic override and inputs from known devices about the aircraft. The door unlocked logic shown in FIG. 7 indicates the unlocking function can be accomplished by either the loss of electrical power which disengages the electrical latching section (inputs 602 or 603), mechanically which results in the retraction of the door bolt (input 604 or 605), or pneumatically (input 606) when a pressure differential exists between the flight deck and passenger cabin (decompression). FIG. 8 indicates the opposite of all the inputs (602, 603, 604, 605 and 606 as shown in FIG. 7) are required to lock the door which will remain locked until decompression occurs causing the pneumatic mechanism to automatically override the anti-hijacking function. It should be noted here that the electrical section for logic control of the present latch/lock mechanism remains engaged and the flight deck door bolt remains locked when the anti-hijacking function is automatically overridden; i.e., the pressure differential releases the spring-loaded piston in the pneumatic device (see FIG. 8).

What is claimed is:

1. An aircraft door anti-hijacking latch lock mechanism having means for providing pneumatic decompression override, said latch lock mechanism having an engaged mode only in response to application of electrical power, said latch lock mechanism further operative in a release mode in response to switch actuation on a pilot panel, loss of electrical power, or key actuation from outside the control cabin of the aircraft wherein said means for providing pneumatic decompression override includes a spring returned striker and spring loaded ball detent arrangement.

2. An aircraft door anti-hijacking latch lock mechanism having means for providing pneumatic decompression override, said latch lock mechanism having an engaged mode only in response to application of electrical power, said latch lock mechanism further operative in a release mode in response to switch actuation on a pilot panel, loss of electrical power, or key actuation from outside the control cabin of the aircraft; and
wherein said means for providing pneumatic decompression override comprises shear rivets sheared during decompression thereby enabling aircraft door opening.

3. An aircraft door anti-hijacking latch lock mechanism having means for providing pneumatic decompression override, said latch lock mechanism having an engaged mode only in response to application of electrical power, said latch lock mechanism further operative in a release mode in response to switch actuation on a pilot panel, loss of electrical power, or key actuation from outside the control cabin of the aircraft wherein said means for providing pneumatic decompression override includes a spring returned striker and spring loaded ball detent arrangement and further including a rotational solenoid, a striker locking pin mechanically connected to said rotational solenoid, said striker locking pin rotating counter-clockwise to a position behind said spring returned striker upon application of power to said rotational solenoid thereby preventing said spring returned striker from rotating in the counter-clockwise direction.

4. An aircraft door anti-hijacking latch lock mechanism having means for providing pneumatic decompression override, said latch lock mechanism having an engaged mode only in response to application of electrical power, said latch lock mechanism further operative in a release mode in response to switch actuation on a pilot panel, loss of electrical power, or key actuation from outside the control cabin of the aircraft wherein said means for providing pneumatic decompression override includes a spring returned striker and spring loaded ball detent arrangement and further including a rotational solenoid, a striker locking pin mechanically connected to said rotational solenoid, said striker locking pin rotating counter-clockwise to a position behind said spring returned striker upon application of power to said rotational solenoid thereby preventing said spring returned striker from rotating in the counter-clockwise direction and wherein said rotational solenoid includes a torsional spring for rotating said striker locking pin clockwise to the unlocked position in response to removal of electrical power from said rotational solenoid either in response to said switch actuation on said pilot panel or said loss of electrical power.

* * * * *